United States Patent [19]

Brinson et al.

[11] Patent Number: 5,542,039
[45] Date of Patent: Jul. 30, 1996

[54] CONTROL FOR SCALED PARAMETERS

[75] Inventors: Kenneth O. Brinson; Wayne E. Galella; Nameeta Sappal, all of Austin, Tex.

[73] Assignee: International Business Machines Corporation, Armonk, N.Y.

[21] Appl. No.: 26,889

[22] Filed: Mar. 5, 1993

[51] Int. Cl.⁶ ........................................... G06F 3/14
[52] U.S. Cl. ............................ 395/161; 395/155; 395/159
[58] Field of Search ...................................... 395/140, 132, 395/155, 159, 275, 500, 800, 119, 161; 358/515; 348/580; 345/174; 364/485

[56] References Cited

U.S. PATENT DOCUMENTS

| 4,890,236 | 12/1989 | Kilk et al. | 364/485 |
| 4,901,221 | 2/1990 | Kodosky et al. | 395/159 |
| 5,053,758 | 10/1991 | Cornett et al. | 345/174 |
| 5,191,643 | 3/1993 | Alsenz | 395/155 |
| 5,371,842 | 12/1994 | Easton et al. | 395/140 |

OTHER PUBLICATIONS

IBM Technical Disclosure Bulletin, Single Display Panel Structure For a PC Audio Editor, vol. 30 No. 10 Mar. 1988, pp. 270 and 271.

IBM Technical Disclosure Bulletin, Integrated Audio-Graphics User Interface, vol. 33 No. 11, Apr. 1991. pp. 368–371.

IBM Technical Disclosure Bulletin, Hybrid Dial/Slider ICON, vol. 33 No. 6A, Nov. 1990, pp. 326 and 327.

*Primary Examiner*—Mark R. Powell
*Assistant Examiner*—Ruay Lian Ho
*Attorney, Agent, or Firm*—Jeffrey S. LaBaw

[57] ABSTRACT

A control comprising a main window and control element movable within the main window is used to control a plurality of scaled parameters. The control is implemented in a graphical user interface for a computer system having a memory, a processor, a display and an input device. At initialization, the x,y coordinate of the control element with respect to the main window corresponds to initial values of a first and a second scaled parameter. As the control element is moved within the main window according to a set of input signals from the input device, a second x,y coordinate of the control element is determined. The first scaled parameter is adjusted according to an x value of the second x,y coordinate and the second scaled parameter is adjusted according to a y value of the second x,y coordinate.

30 Claims, 7 Drawing Sheets

CONTROL FOR SCALED PARAMETERS

BACKGROUND OF THE INVENTION

This invention generally relates to a graphical user interface for displaying data on a display of a data processing system in an object-oriented software program. More particularly, it relates to a single control for changing a plurality of parameters each of which range in value along a respective scale.

To provide accessibility and ease of use to the functions of a modern day data processing system, it has become commonplace to construct a Graphical User Interface (GUI) to control the system. To maximize the amount of information while maintaining the legibility of that information presented by computer display, certain display controls have been employed.

Traditionally, linearly or logarithmically scaled variables such as volume or balance are controlled by the use of a slider or a knob in a graphical user interface. Such variables can be changed within a given range, e.g., from zero to a predetermined maximum value by manipulating the appearance of the slider or knob in the GUI. As the two functions are independent of each other, there is generally one knob for volume control and another knob for balance control. To change a parameter associated with a slider or a knob the user will bring a pointer, typically controlled by a mouse, to a particular volume portion of the slider or a knob, and manipulate the slider or knob appearance.

While this type of graphical user interface is adequate, as the number of applications which share the available presentations space in the GUI proliferate in number, screen space becomes a premium. Generally, the display space allocated to each application's window will shrink in size. When an application uses a number of controls for each of the variables, not all of them can be displayed at the same time. Therefore, it would be desirable to have a control which could manipulate a plurality of independent variables.

Further, while variable pairs such as volume and balance, bass and treble, contrast and brightness are independent of each other, conceptually they are related. It would be desirable to have a control which can change such pairs of conceptually related parameters simultaneously. This invention teaches such a control.

SUMMARY OF THE INVENTION

It is therefore an object of the present invention to provide a single control for manipulating a plurality of scaled parameters in a graphical user interface.

It is another object of the present invention to simplify the graphical user interface by eliminating the need for additional controls to control each scaled parameter.

It is another object of the present invention to change a plurality of conceptually related, scaled parameters by manipulating a control in a graphical user interface.

These and other objects, features and advantages are accomplished by a control comprising a main window and control element movable within the main window. The control is implemented in a graphical user interface for a computer system having a memory, a processor, a display and an input device. The control is initialized by selecting an icon in a graphical user interface presented on the display. The control is presented on the display in its initial configuration having a main window and control element which is horizontally and vertically movable within the main window. The x,y coordinate of the control element with respect to the main window corresponds to initial values of a first and a second scaled parameter. As the control element is moved within the main window according to a set of input signals from the input device, a second x,y coordinate of the control window is determined. The first scaled parameter is adjusted according to an x value of the second x,y coordinate and the second scaled parameter is adjusted according to a y value of the second x,y coordinate. One example of a first and second scaled parameter is balance and volume which are used as inputs for an audio card controlling a speaker.

The input device is most likely a mouse and the movement of the control element is accomplishing by moving a pointer to the control element, pressing a button on the mouse, dragging the control element to a new position in the main window and releasing the button on the mouse. In certain operating environments, the convention is to hide the control element when the button is depressed and the pointer is over the control element, change the pointer to resemble the control element and restore the control element and the pointer when is button is released.

The main window may be sizable. If so, adjusting the first or second scaled parameter will entail determining the width or height of the main window and normalizing the x or y coordinate according to the width or height of the main window.

The control can also be extended to control more than two scalable parameters. For example, an input device such as a pressure sensitive touch sensor can be used to input z axis information. The z coordinate of the control element can be changed and a third scalable parameter can be adjusted according to the z coordinate. The control element presentation is also changed according to the z coordinate, by changing size, color or intensity of the control element.

BRIEF DESCRIPTION OF THE DRAWINGS

These and other objects, features and advantages will be more easily understood in connection with the attached drawings and following description.

DETAILED DESCRIPTION OF THE DRAWINGS

The invention may be run on a variety of computers or collection of computers under a number of different operating systems. The computer could be, for example, a personal computer, a mini computer or mainframe computer. or a workstation in a network such as a Local Area Network or Wide Area Network or larger teleprocessing system. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal* Systems/2 Model 50, 60 Systems IBM Corporation, Part No. 68X2224 Order Number S68X-2224 and *Technical Reference Manual Personal Systems/2* (Model 80) IBM Corporation Part No. 68X 2256 Order Number S68X-2254. One operating system which an IBM PS/2 personal computer may run is IBM's OS/2 2.0 (TM) for more information on the IBM OS/2 2.0 Operating System the reader is referred to *OS/2 2.0 Technique Library, Programming Guide Vol.* 1, 2, 3 *Version* 2.00 Order Nos. 10G6261, 10G6495, 10G6494.

Figure 1:
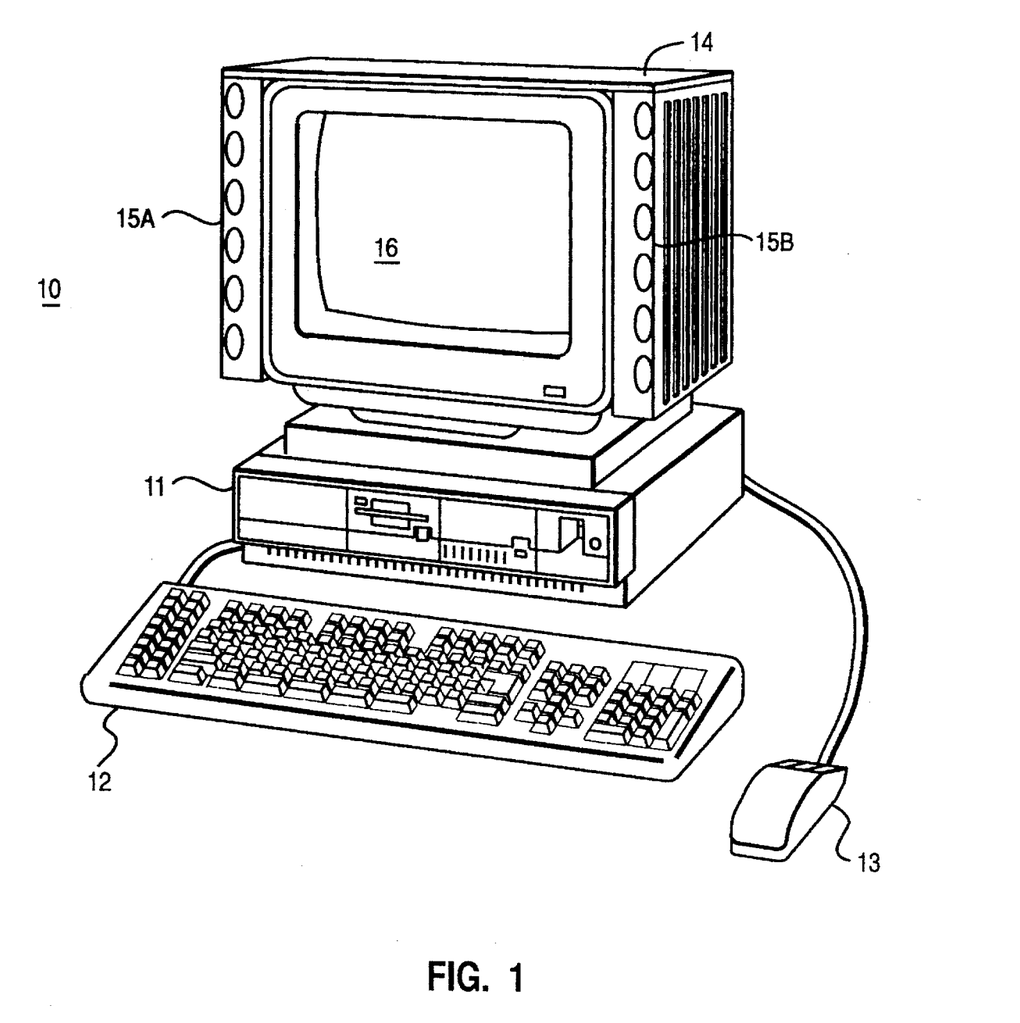
FIG. 1 shows a computer comprising system unit, keyboard, mouse and display.

In FIG. 1, a computer 10, comprising a system unit 11, a keyboard 12, a mouse 13 and a display 14 are depicted. The screen 16 of display device 14 is used to present the visual changes to the data object. The graphical user interface supported by the operating system allows the user to use a point and shoot method of input by moving the pointer to an icon representing a data object at a particular location on the screen 16 and press one of the mouse buttons to perform a user command or selection.

Figure 2:
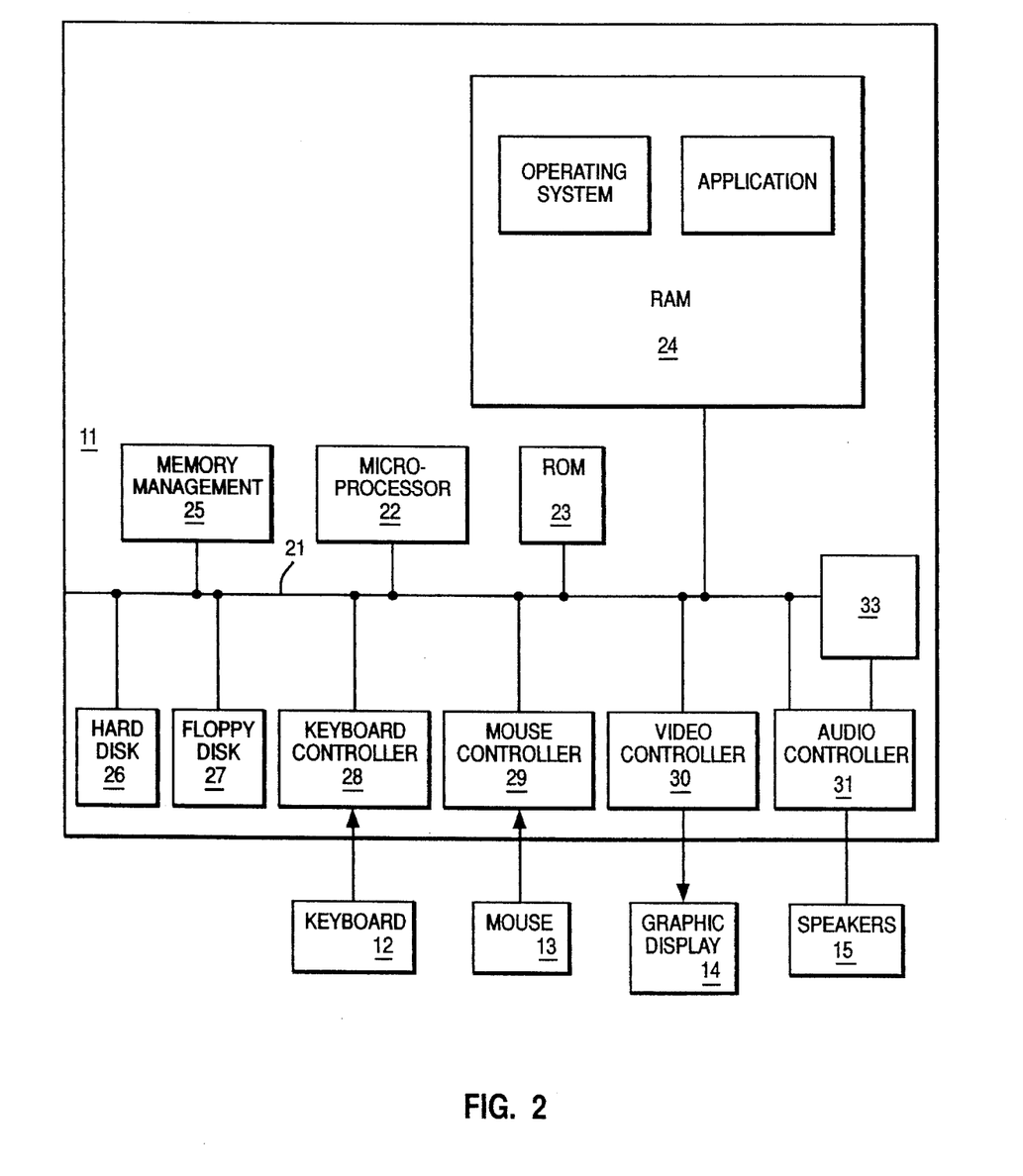
FIG. 2 is a block diagram of the components of the computer shown in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. Also coupled to the system bus 21 is digital signal processor 33 which is incorporated into the audio controller 31. An I/O controller 40 such as a Token Ring Adapter enables communication over a network 106 to other similarly configured data processing systems.

Pictured within random access memory 24 is operating system 44 and application program 46. The operating system 44 controls the graphical user interface presented by the computer on the display and the access of other application programs to user input from the input devices. Some operating systems may operate in cooperation with a presentation manager to manage the graphical user interface. For example, Windows 3.1™, a presentation manager, operates over the Disk Operating System (DOS) for the IBM compatible computers. On the other hand, OS/2™ is a single software product, which includes both presentation manager and operating system functions. One skilled in the art would recognize that the block 44 represents the code which performs both sets of functions no matter how they may be configured. In the graphical user interface, the objects, e.g., the operating system, operating system utilities, applications and data files are represented by icons on the system display. Once the user moves the cursor or pointer to an icon position and manipulates the keyboard or mouse, the object is opened. For example, to invoke the application 46, the user would move the mouse pointer to an icon in a GUI which represented the application and click on the left mouse button. For the purposes of this invention, an icon should be considered as a minimized window.

Although such operating systems will allow a plurality of application programs to run concurrently, for the sake of simplicity, only one application is shown in the random access memory 24. Nonetheless, as the increasing sophistication of operating systems and users is addressed by this invention, with the growing number of applications, a graphical user interface quickly becomes crowded.

The control can be implemented as part of the operating system, or as a separate application program. If the control is a part of the operating system, a new control type would be defined, together with the new control type's characteristics and behaviors. When an application wanted to use such control, it would create a child window or object and classify it as this type of control. A separate data space would be stored in RAM describing the scaled parameters which would be controlled and any required information relating to the control characteristics or behaviors. As a separate application program, the control could be implemented in two different ways depending on the capabilities of the base operating system. If the operating system keeps track of the location of objects in its display space, such as windows, icons, pointers, etc., the application could use these operating system facilities to help create and track position of windows which would define various parts of the control. If the operating system did not keep track of window position and objects in the display space, the programmer would have to write his own routines to keep track of the control.

Figure 3:
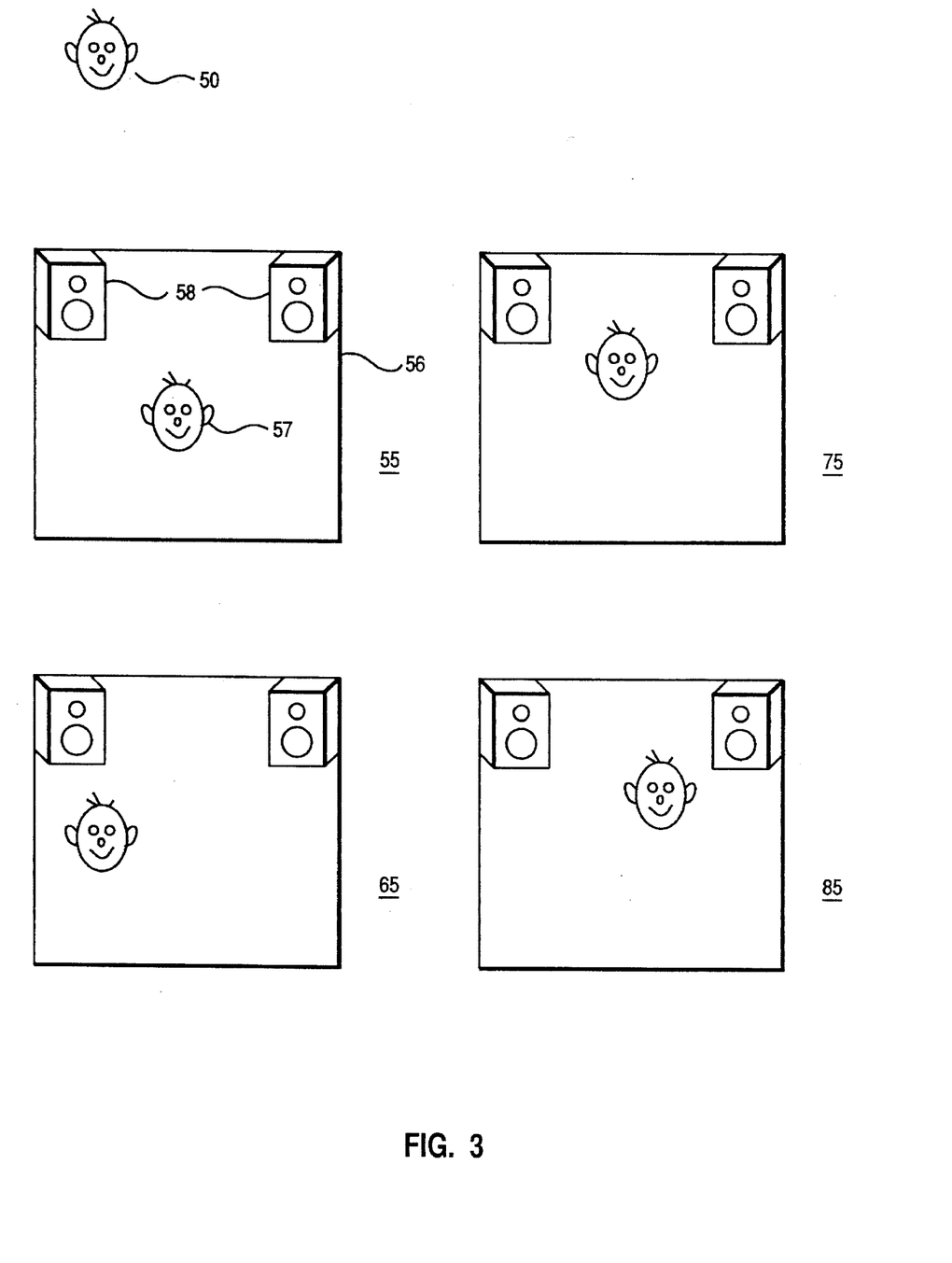
FIG. 3 shows the graphical user interface control used to change the volume and balance for an attached audio card.

FIG. 3 shows one embodiment of the control in a graphical user interface. In the figure, a series of representations of the control as it is used to change volume and balance are depicted, as it would be presented on the system display. Thus, the control replaces two sliders or knobs which might be used in a prior art graphical user interface.

At first, the control is presented in its minimized form as an icon 50. When the user wants to invoke the control, he moves the mouse pointer over the control and presses the left mouse button twice. These actions cause the operating system to create the control in its initial configuration 55. The control 55 consists of a main window 56 and a control window 57 located therein. While the control element is described as a window in the description herein, there is no need for the control element to have all the characteristics associated with a window. It is required to have an x,y coordinate known to the system, to be capable of movement within the main window and to be presented to the user in a manner indicative of its movement. A window is simply an easy way to construct the control in an operating system. Both the main window 56 and the control window 57 may be customized in appearance. The control window 57 resembles a face and the main window 56 has two speakers 58 in the top corners. It is intended that the control 55 resemble an illustration of a person in a room with two speakers on the back wall. As the person approaches speakers, the volume is increased; if the person approaches the left speaker, the balance is adjusted accordingly by reducing the volume of the right speaker. Thus, the control is intuitive to the user. Alternatively, the control could be as simple as a dot in the box. The user may adjust the balance separately by moving the control window 57 in a horizontal along the X axis. For example, in the control's second configuration 65, the user has moved control window 57 to the left. The computer system would reduce the right speaker volume to achieve the appropriate balance. Alternatively, the user can change only volume as shown in the control's third representation where the control window 57 has been moved in a Y axis or a vertical direction. Moreover, the user can change the volume and balance parameters concurrently by moving the control window 57 in the diagonal direction, as shown in the fourth representation of the control 85. This is something which could not be accomplished by the prior art controls. With this control, the process of adjusting the volume and the balance need not be a two step process as it has been in the past.

Since the control may be implemented as an application, it may include the regular features of an application window including a title bar, and menu bar and sizing controls. The menu bar could contain a series of options available to the user. For example, one option, available either in the menu bar or a pull down menu from the menu bar, might be to keep balance or volume constant. A user with an unsteady hand may wish to change only volume without worrying whether the control element is being guided in the exact center of the main window.

The path of the control element can be presented as a dotted line. This will help the user understand the relationship between the initial position and the current position of the control element.

The control can be used to change the value of any scaled parameter, whether the scale be a linear scale or logarithmic scale or some other type of scale. For example, volume is typically changed according to a logarithmic scale because of the way sound is perceived by human ear.

A similar control could be used to support a surround sound application where a first pair of speakers of a sound system were located at the front wall of the room, represented by speaker icon at the top of the main window, and a second pair of speakers were located at the back of the room, represented by speaker icons at the bottom corners of the control. In this case, one variable would be the balance and the other would be the fader between the front and back speakers. Other audio parameters which could be manipulated by the control include tone, bass, treble.

The control could be used in a speech synthesis application to control pitch and rate. When listening to a speaker, it is known that a better comprehension level is attained when a recording of the speaker is accelerated to a speed greater than most humans generally speak. However, as the rate of speed of the recording is increased, the pitch of the speaker's voice must be lowered to avoid chipmunk-like timbre. In one stroke of the mouse, both parameters can be changed. In other embodiments of the invention, other scaled parameters such as video parameters such as brightness, contrast, color spectrum and so forth could also be controlled.

Figure 4:
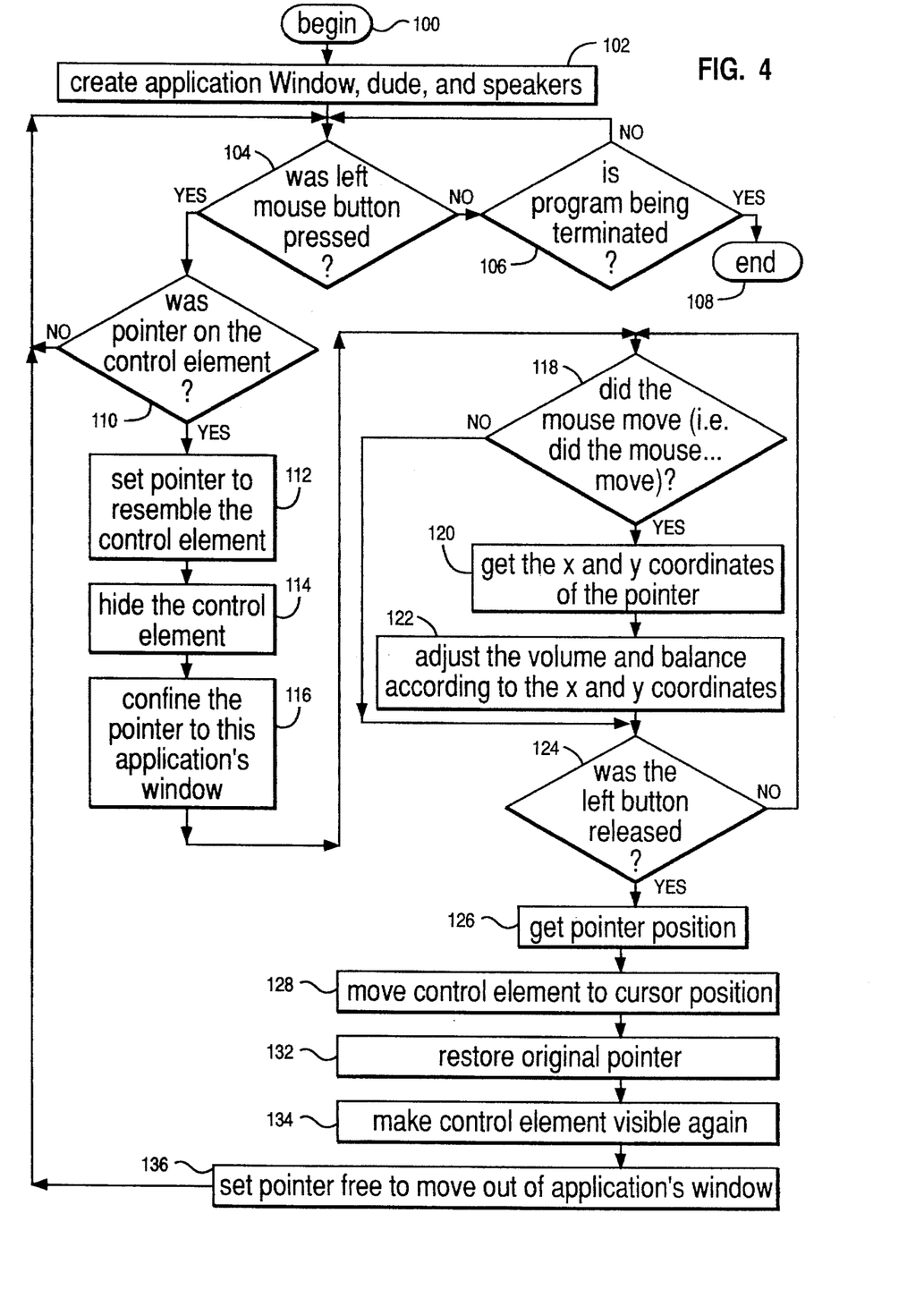
FIG. 4 is a flow diagram of manipulating the control for two independent variables.

FIG. 4 shows a flow diagram of the process to present the control in the graphical user interface and manipulate it to change volume and balance output by an audio card in a computer system. In the diagram, the control is implemented as an application in the WINDOWS™ operating environment. The reader should understand that the control could be implemented as an application or part of an application using other operating systems or as part of an operating system. The process begins as the user clicks on the icon representing the application program, in step 100. This tells WINDOWS™ and the underlying operating system, DOS, to invoke the application main window, the control window and windows representing the speakers. In WINDOWS™, it is easier to paint the speakers as separate windows, rather than changing the appearance of the main window frame. Information on the WINDOW™ operating environment can be found in Microsoft Windows 3.1™ Software Development Kit "Guide to Programming" #0392 part no. 28919.

The main window of the Acoustic Dude program is created by a call to the WINDOWS™ function 'CreateWindow'. The size of the window is set to its initial parameters, a good choice is 1.8 logical inches long and 1.5 logical inches wide. The control is also painted in its initial position, the middle of the screen. Once the main window has been created, the three subwindows, the speakers and the, control window, are created and placed on top of the main window. The subwindows are also created by calling the 'CreateWindow' function. All the subwindows are sized at the default of size of an icon. The first subwindow contains the icon representing the left speaker and is placed in the top left corner of the main window. The second subwindow contains the icon representing the right speaker and is placed in the top right corner of the main window. The third subwindow contains the icon representing the control window and is placed in the middle of the main window. Each call to the Windows function 'CreateWindow' returns a window handle to the newly crated window. This window handle is used to identify that window in any window operation such as moving the window to another location, hiding the window, etc.

The control could be written to run on any other operating systems in addition to WINDOWS™. On OS/2, for example, the creation of the windows needed for the control would be very similar to that in WINDOWS. An OS/2 PM function to create a window would be called with the window size, position, etc, and a handle to the window is returned. On DOS, the programmer would have to write their own routines to draw a window on the screen, place the control window and the speakers in the appropriate positions and move the control window around. If a mouse is not supported, the arrow keys on the keyboard could be used to move the control window around the main window.

Returning to FIG. 4, a test performed in step 104 to determine whether the left mouse button was pressed. If not, a test is performed in step 106 to determine whether the program is being terminated. If so, the program terminates in step 108. If the program is not being terminated, the application continues to search for a left mouse button down input. Next, in step 110, after the application receives a left mouse button down input, a test is performed to determine whether the cursor was on the control window. If the cursor was not on the control window, the program returns to step 104.

In the WINDOWS™ operating environment, an interesting convention is used when the mouse is used to grab and drag an icon to another position. The grab and drag operation is accomplished by pressing and holding a mouse button. Once the mouse has successfully grabbed the icon, the mouse pointer icon takes the grabbed icons appearance and the grabbed icon is hidden. The new representation of the grabbed icon is attached to the screen position of the mouse as the user manipulates the mouse. Once the grabbed icon is dropped by releasing the mouse button, the mouse pointer regains its normal appearance and the grabbed icon is repainted at its new coordinates.

Returning to FIG. 4, if the left mouse button is pressed over the control window, the appearance of the cursor is set to resemble the icon which represents the control window in step 112. Next, the control window is hidden in step 114. Thus, the control operates according to the WINDOWS™ conventions. In other operating systems, the control could operate where the pointer drags the control window icon and both are displayed concurrently. By hiding the control window, the visual representation is somewhat less cluttered and the operating system does not have to repaint both the pointer and control window icon as the control is manipulated. In further embodiments of control below, even within the WINDOWS™ environment, as it is expanded to more than two parameters, both pointer and the control window are displayed within the control. Next, in step 116, the cursor pointer is confined to a main window of the application. This is done because the range of volume and balance parameters are bounded by the application window. Positions outside the application window make no sense. Alternatively, the control could automatically default to a maximum or minimum value.

A test is performed in step 118 to determine whether the mouse is moved. If so, in step 120, the X and Y coordinates of the pointer icon which now also represents the control window is determined. In WINDOWS™, there is a function called "GetCursorPOS" which determines the X and Y coordinates of the pointer. Although an icon actually is displayed over a range of X and Y coordinates on the display, there is a single X, Y coordinate which is deemed to be the icon position. The rest of the icon is painted according to this position. In Windows, the new position of the pointer is relative to the main window by calling the "ScreentoClient" function which translates the screen coordinates of the pointer to the main windows' coordinates. Similar functions exists in other operating systems. If the application were operating in an environment in which such functions did not exist, the programmer would have to develop his own routines to establish the X and Y coordinates and support the graphical user interface.

In step 122, the volume and balance are adjusted according to the X and Y coordinates. This step may initialized by calling to determine whether there is an audio device coupled to the system bus which supports changing volume and balance and then calling a function to adjust volume and balance according to these inputs. This process described in greater detail in FIG. 5. In alternative embodiments of the invention, where both the pointer and the control window icons are displayed in the control, the X and Y coordinates of the control window icon can be used to determine volume and balance if they differ from the X and Y coordinates pointer icon. Further, although desirable, it is not necessary to adjust the volume and balance until the pointer reaches its final position. Thus, in that case, the X and Y coordinates of the pointer position while it uses the control window icon during the drag operation would not be used.

In step 124, a test is performed to determine whether the left mouse button was released. If not, the process proceeds to step 118. If so, the pointer position is determined in step 126 and the control window position is moved in step 128. In step 132, the original pointer icon is restored. The hidden control window is made visible in step 134. In step 136, the cursor is set for it to move out of the application window. The process returns to step 104 to search for the left mouse button down input.

Figure 5:
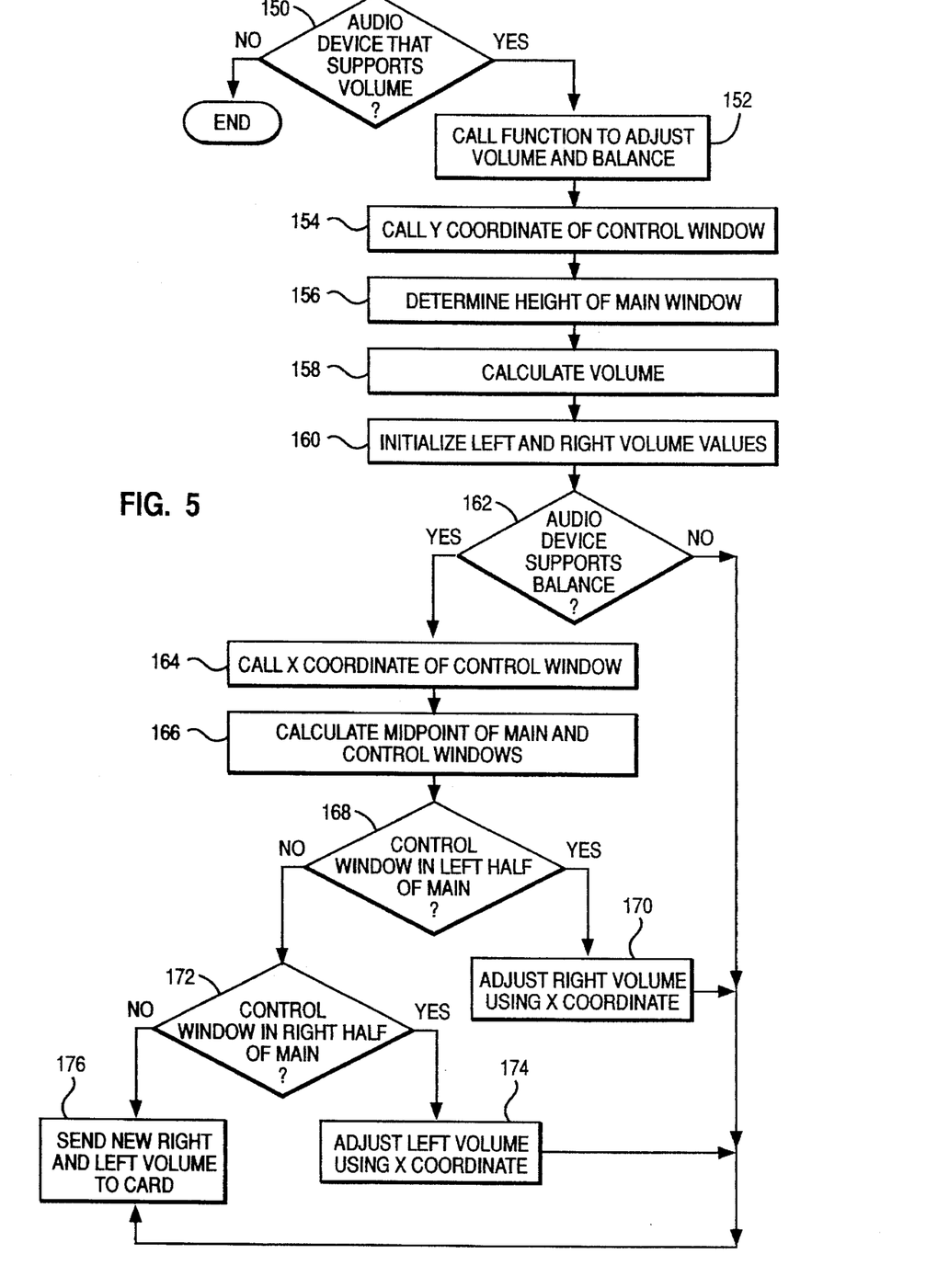
FIG. 5 is a flow diagram of the adjusting volume and balance for an audio card in response to changes in the control.

A procedure to change the volume and balance of an audio card incorporated into the computer system is shown in FIG. 5. After the current cursor or control window coordinates are obtained, step 150 determines whether there is an audio device that supports changing volume. If not, the process ends and the computer returns to other processing. If there is such an audio device, in step 152, the function to adjust volume and balance is called. Next, in step 154, the Y coordinate of the displayed control window icon is called. As discussed above, in the Windows environment, the control window icon is attached to the pointer position in a drag and drop operation. In step 156, the height of the main window is determined. This step may be omitted if the main window is not sizeable, since the volume algorithm can contain the fixed value of the parameters used to initialize the appearance of the main window. However, if the window is sizeable, the Y coordinate must be normalized so that volume associated with the Y coordinate at the mid-point of a proportionately larger window is no louder than the volume associated with the Y coordinate at the mid-point of a proportionately smaller window. Next, in step 158, the volume is calculated. One equation which may be used is to set the volume equal to the maximum volume allowed divided by the height of the main window times the Y coordinate value. This assumes that the volume ranges from zero to the maximum value of the volume. A range of volumes that did not start at zero would have to have a constant added to the equation. In step 160, the left and right volume values are set for the volume calculated in step 158.

Next, a test is performed in step 162 to determine whether the audio device supports balance. If not, the process skips to step 176 to send new right and left volumes to the card. However, if the audio device does support balance, in step 164, the X coordinate of the control window icon is called. In step 166, mid-points of both the main and control windows are calculated. This entails retrieving the width of both the main and control windows and knowledge of the point on the control window which represents the X and Y coordinate. If the x, y coordinate of the control window is centered its mid-point does not need to be calculated. On a normal stereo system, the left or right speaker is turned off as the balance knob is turned to the right or left respectively. Therefore, the control should operate in a similar manner so that the result will be as the user expects. In step 168, a test is performed to determine whether the control window is in the left half of the main window. If so, the volume of the right speaker will be adjusted in step 170. The new right volume is equal to the volume calculated above divided by one half the width of the main window multiplied by the x position of the pointer/control window icon. If the control window is not in the left half, a test is performed to determine whether the control window is in the right half of the main window in step 172. If so, the left speaker volume is adjusted using the X coordinate of the control window, step 174. The new left volume is equal to the volume calculated above divided by one half the width of the main window multiplied by the window width minus the x position. If the control window is neither in the left or right half of the main window, it must be at the midpoint. Therefore, no further adjustment of the right or left speaker volume is necessary. In step 176, the new right and left volumes are sent to the audio card.

Optionally, the program may be written to account for the differences in the volume outputs expected by different audio cards made by different vendors. For example, a card by one vendor may expect a MIDI output whereas a second card might not. Further, one card may expect the volume to be expressed as a linear digital number and adjust the volume according to a logarithmic scale itself, while another card would require that the volume be present to a logarithmic value. The human perception of audio volume is logarithmic in nature. For example, a drop of one-half in the amplitude of an audio signal corresponds to a discerned decrease of significantly less than one-half of the original volume. Thus, the perceived volume should be calibrated to the perceived movement of the control window; a logarithmic volume value should ultimately result from a linear change in the X,Y coordinates of the control window.

In some systems, a plurality of audio cards may be coupled to the system bus. The control may interogate each card to determine whether it is supported and what values of volume and balance it expects to receive. A menu of choices could then be presented to the user int he graphical user interface inquiring as to which audio card the user wishes to use.

It is likely that the control could be packaged with an audio card as an application on a diskette with the device drivers for an audio card for various computers. As the device driver is installed which provides the software interface between the card and the other software resident on the computer, the user would be queried as to whether the control for volume and balance should also be installed.

The use of the control can be expanded beyond two parameters. This is relatively easy to do when a pointing device which registers a Z axis, such as a pressure sensitive touch sensor is utilized. For example, a third variable in an audio context might be tone or loudness where the low bass and the high treble are amplified preferentially. This is a typical stereo system setting usually used at low volumes, but usually the choices are "on or off". Using the control, the loudness can be scaled and customized to the user's taste.

Figure 6:
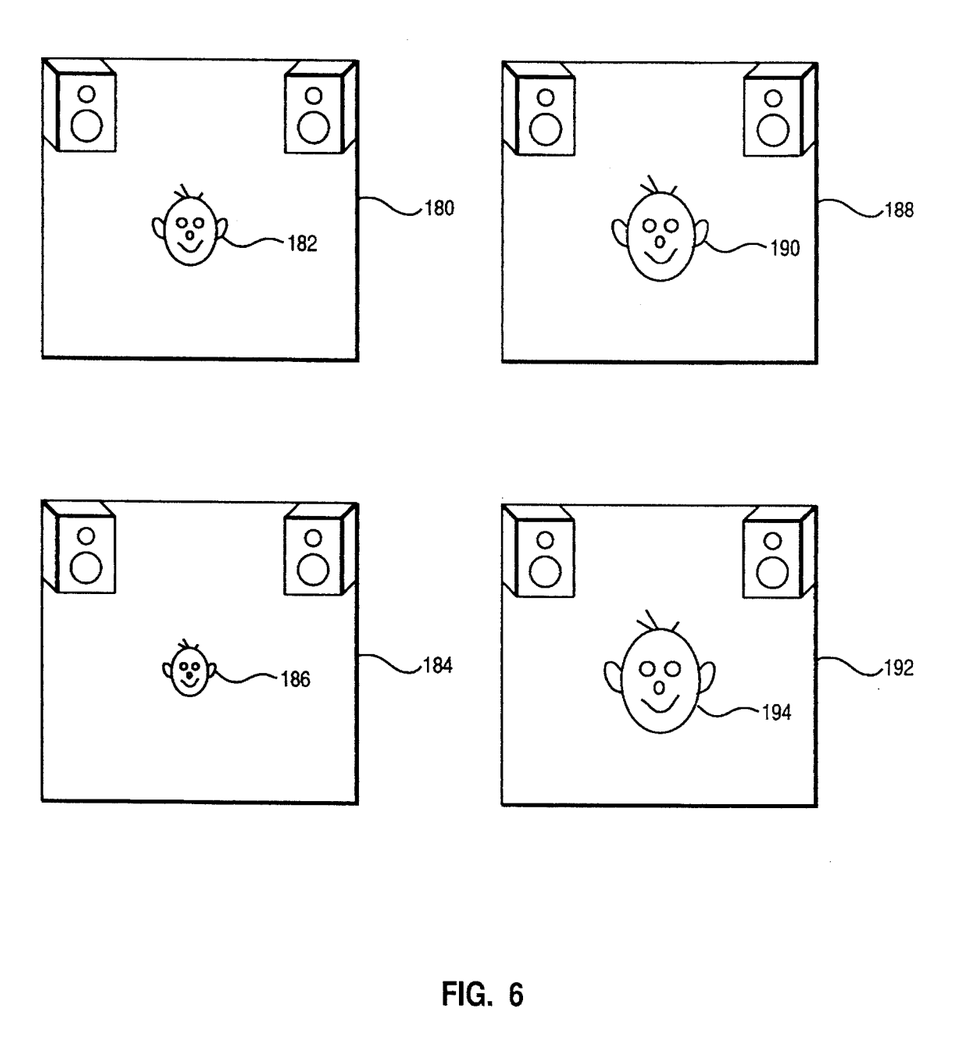
FIG. 6 shows the graphical user interface control depicted in FIG. 3 used to change a third parameter, tone, for an attached audio card.

The main window 180 and control window 182 are first shown in the default condition. In the second representation of control, pressure has been applied to the touch sensor and so the control window 186 reduced in size relative to the main window 184, to emulate the control window receding in the distance along the Z axis. In the third representation of the control, less pressure has been applied to the touch sensor so that the control window 190 is enlarged relative to the main window 188. In the fourth representation, the user continues to use less pressure on the touch sensor and the control window 194 increases in size, relative to the main window 192. The user would intuitively understand that the third value which is represented by the Z axis, would get larger as a control window increases in size and would get smaller as the control reduces in size.

Figure 7:
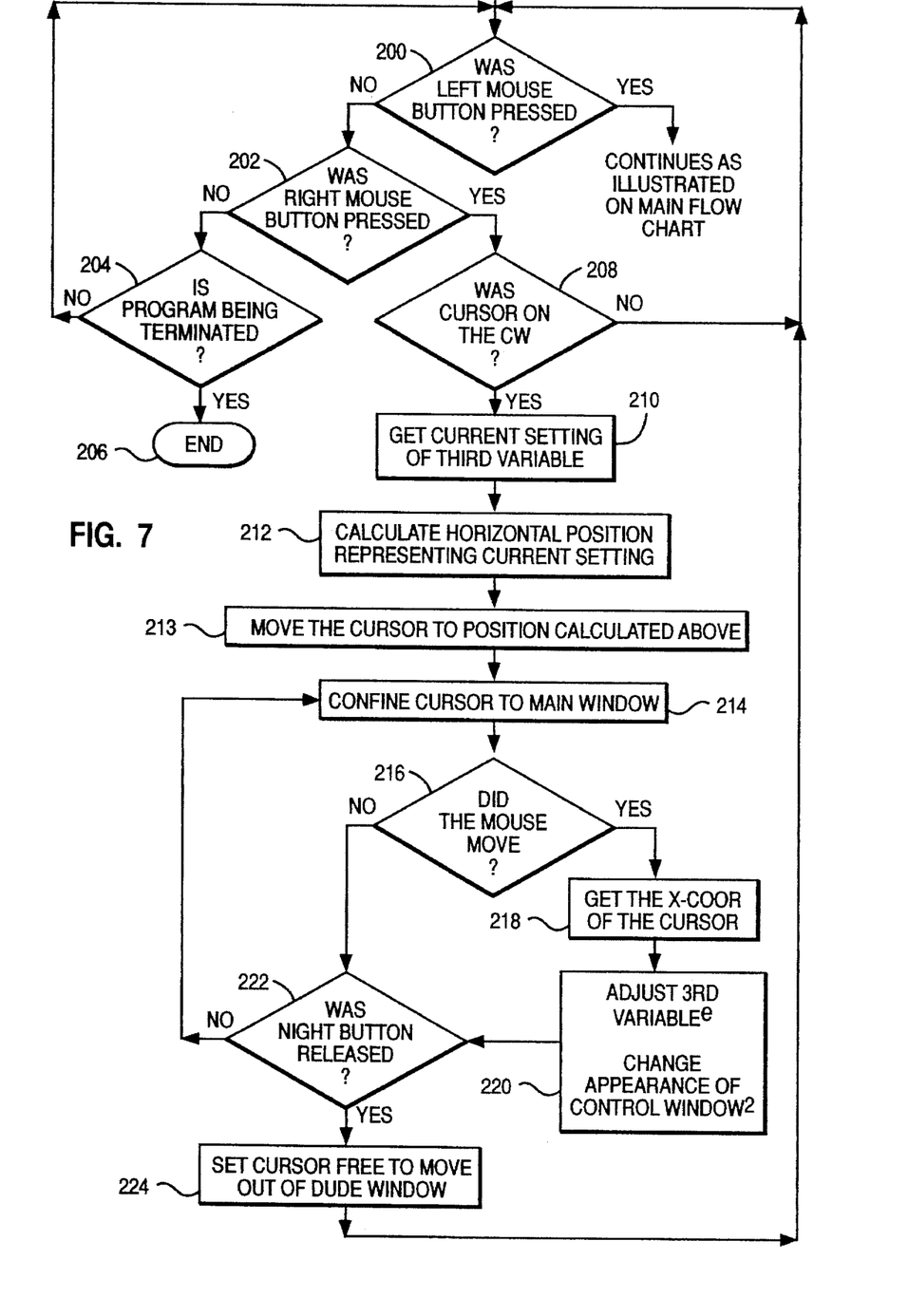
FIG. 7 is a flow diagram of the manipulating the control for a third independent variable.

It is somewhat more difficult to extend the use of the control to more than two parameters when using an input device such as a mouse which only provides input in X and Y coordinates. However, as shown in FIG. 7, it is possible. The process starts in step 200 with a test for whether the left mouse button is being pressed. This is analogous to step 104 in FIG. 4. If the left mouse button were being pressed, the flow would continue as illustrated in that figure. If not, the process would proceed to step 202 to determine whether the right mouse button were being pressed. If not, the test for program termination is performed in step 204. If so, the process ends step 208. However, if the right mouse button is being pressed, a test is performed to determine whether the mouse pointer is on the control window in step 208. If that is true, the control recognizes that the user is attempting to manipulate a third or possibly a fourth variable. In this figure, only a third variable, tone, for example, will be manipulated.

The process proceeds by obtaining the current or default setting of the third variable in step 210. Next, in step 212, the horizontal position representing the current setting of the tone is calculated. This is done by dividing the current setting of tone by maximum value of tone and multiplying the result by the width of the main window, assuming that the range of the tone parameter goes from zero to the maximum value of tone. Next, the cursor is moved to the position which is calculated in step 213. Note that the control window stays at the position it was in step 208. Next, the cursor is confined to the main window in step 214 to prevent nonsensical input values for tone. Next, in step 216 a test is performed to determine whether the mouse moved the mouse pointer. If it did, the new X coordinate of the cursor is obtained in step 218. In step 220, tone is adjusted according to the new horizontal position of the pointer and the appearance of the control window is changed. Thus, as the mouse pointer is moved laterally, the control window would be displayed smaller or larger as shown in FIG. 6.

A fourth variable could be adjusted at the same time according to the vertical position of the pointer. In this case, the appearance of the control window would change in a different manner. For example, the control window could change color from red to violet, along the colors of the spectrum or go from dim to maximum brightness. Other combinations of left and right mouse button presses could be set to yet other variables, however, there is probably a limit to the number of variables which should be represented by one control.

The mouse driver could also be programmed to recognize certain timed sequences of mouse button clicks as a request to manipulate the control in the Z direction. However, this may take more manual dexterity than possessed by the average computer user and deemed to be a user unfriendly interface.

While the description above has been primarily concerned with the control of audio parameters, other parameters such as brightness, tint, contrast related a display may also be controlled according to the present invention. The variables may or may not be related to each other. However, they must be variables which vary in a range which can be represented by a scale. Whether that scale is linear, exponential or logarithmic is immaterial. However, the movement of the control element or mouse pointer as it goes from left to right or down to up should correspond to a increase or decrease in the parameters being controlled. Scaled parameters should be distinguished from the display parameters which are related to the actual display of the control element or the pointer as it moves across the screen. Obviously, as the control element moves the brightness and hue values associated with particular display pixels change. The invention is not intended to claim this type of display related parameter change.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A method of controlling a plurality of scaled parameters with a computer system having a memory, a processor, a display and an input device, comprising the steps of:

presenting a control on the display, the control having a main window and a control element which is movable within the main window;

determining a coordinate of the control element relative to a main window reference point, the coordinate and the reference point having a plurality of components; and adjusting values of a first and a second scaled parameter according to a first and a second function respectively, wherein an input to the first function is the difference between a first component of the coordinate and the reference point and an input to the second function is the difference between a second component of the coordinate and reference point.

2. The method as recited in claim 1 wherein movement of the control element in a direction Which cause the first component of the coordinate to increase causes a corresponding increase in the value of the first scaled parameter.

3. The method as recited in claim 1 which further comprises the steps of:

moving the control element within the main window according to a set of input signals from the input device;

determining a second coordinate of the control element; and adjusting the first scaled parameter according to the first function using the difference between the first component of the second coordinate and the reference point as an input.

4. The method as recited in claim 3 which further comprises the step of adjusting the second scaled parameter according to the second function using the difference between the second component of the second coordinate and the reference point as an input.

5. The method as recited in claim 2 wherein the input device is a mouse and the moving step is accomplishing by moving a pointer to the control element, pressing a button on the mouse, dragging the control element to a new position in the main window and releasing the button on the mouse.

6. The method as recited in claim 5 which further comprises the continuously adjusting the first scaled parameter as the control element is moved according to the first function using the difference between a first component of a current coordinate and the reference point as an input.

7. The method as recited in claim 1 wherein the adjusting step further comprises the steps of:

determining a dimension of the main window; and normalizing the the difference between the first components of the first coordinate and the reference point according to the dimension of the main window.

8. The method as recited in claim 2 wherein the first scaled parameter is balance and the second scaled parameter is volume and the computer is coupled to an audio card controlling a speaker.

9. The method as recited in claim 2 which further comprises the steps of:

changing a value of a third component of the coordinate of the control element;

presenting the control element according to the value of the third component;

adjusting a third scaled parameter according to a third function which uses the value of the third component as an input.

10. A system for controlling a plurality of scaled parameters with a computer system having a memory, a processor, a display and an input device comprising:

means for presenting a control on the display, the control having a main window and a control element which is movable within the main window;

means for determining a coordinate of the control element with respect to the main window, the coordinate having a plurality of components; and means for adjusting values of a first and a second scaled parameter according to the coordinate, the first scaled parameter adjusted according to a first function in which a first component of the coordinate is an input, the second scaled parameter adjusted according to a second function in which a second component of the coordinate is an input.

11. The system as recited in claim 10 wherein movement of the control element in a direction which causes the first component of the coordinate to increase causes a corresponding increase in the value of the first scaled parameter.

12. The system as recited in claim 10 which further comprises:

means for moving the control element within the main window according to a set of input signals from the input device;

means for determining a second coordinate of the control element: and means for adjusting the first scaled parameter according to the first function using the first component of the second coordinate as an input.

13. The system as recited in claim 12 which further comprises means for adjusting the second scaled parameter according to the second function using the second, component of the second coordinate as an input.

14. The system as recited in claim 11 wherein the input device is a mouse.

15. The system as recited in claim 10 wherein the adjusting means further comprises:

means for determining a dimension of the main window; and means for normalizing the value of the first scaled parameter according to the dimension of the main window.

16. The system as recited in claim 11 wherein the first scaled parameter is balance and the second scaled parameter is volume and the computer is coupled to an audio card controlling a speaker.

17. The system as recited in claim 11 which further comprises:

means for changing a value of a third component of the coordinate of the control element;

means for presenting the control element according to the value of the third component;

means for adjusting a third scaled parameter according to a third function which uses the third component as an input.

18. A computer program product on a computer readable medium for controlling a plurality of scaled parameters executable on a computer system having a memory, a processor, a display and an input device comprising:

means for presenting a control on the display, the control having a main window and control element which is movable within the main window;

means for determining an coordinate of the control element with respect to the main window, the coordinate having a plurality of components; and means for moving the control element in a first direction represented by a first component of the coordinate and in a second direction orthogonal to the first represented by second component of the coordinate;

means for adjusting a first and a second scaled parameter, the first scaled parameter increasing in value as the control element is moved in the first direction, the second scaled parameter increasing in value as the control element is moved in the second direction.

19. The product as recited in claim 18 which further comprises means for continuously adjusting the first scaled parameter as the control element is moved according to the first function using the difference between a first component of a current coordinate and the reference point as an input.

20. The product as recited in claim 18 which further comprises:

means for moving the control element within the main window according to a set of input signals from the input device;

means for locking the first component of the control element so that input signals moving the control element in the first direction are ignored; and means for independently adjusting the second scaled parameter as the control element is moved in the second direction.

21. The product as recited in claim 18 which further comprises means for independently adjusting the first and second scaled parameters according to movement of the control element within the main window.

22. The product as recited in claim 18 wherein the adjusting means further comprises:

means for determining a dimension of the main window; and means for normalizing the value of the first scaled parameter as a function of the dimension of the main window.

23. The product as recited in claim 19 wherein the first scaled parameter is balance and the second scaled parameter is volume and the computer is coupled to an audio card controlling a speaker.

24. The product as recited in claim 19 which further comprises:

means for changing a value of third component of the coordinate of the control element;

means for presenting the control element according to the value of the third component;

means for adjusting a third scaled parameter, the third scaled parameter increasing the value as the value of the third component is increased.

25. The product as recited in claim 19 wherein the first scaled parameter is balance and the second scaled parameter is volume and further comprises an audio card which can control a speaker.

26. A method for simultaneously adjusting a plurality of scaled parameters with a computer system comprising the steps of:

presenting and moving a control element within a bounded display space on a display;

changing a first scaled parameter according to a a first function using inputs of a horizontal distance of the control element from a reference point in the display space and a width of the display space; and changing a second scaled parameter according to a a second function using inputs of a vertical distance of the control element from the reference point and a height of the display space.

27. The method as recited in claim 26 wherein the horizontal distance is the horizontal distance from a current x coordinate of the control element to a display space boundary and the first function is proportional to the ratio of the horizontal distance and the display space width.

28. The method as recited in claim 26 wherein the vertical distance is the vertical distance from a current y coordinate to a display space boundary and the second function is proportional to the ratio of the vertical distance and the display space width.

29. The method as recited in claim 26 wherein the horizontal distance is the horizontal distance from a current x coordinate to a display space boundary and the first function comprises the log of the ratio of the horizontal distance and the display space width.

30. The method as recited in claim 26 wherein the vertical distance is the vertical distance from a current y coordinate to a display space boundary and the second function comprises the log of the ratio of the vertical distance and the display space width.

* * * * *